United States Patent
Teolis et al.

(10) Patent No.: US 7,424,823 B2
(45) Date of Patent: Sep. 16, 2008

(54) METHOD OF DETERMINING THE OPERATING STATUS OF A TURBINE ENGINE UTILIZING AN ANALYTIC REPRESENTATION OF SENSOR DATA

(75) Inventors: Carole Teolis, Glen Dale, MD (US); Anthony Teolis, Glen Dale, MD (US)

(73) Assignee: Techno-Sciences, Inc., Lanham, MD (US)

(*) Notice: Subject to any disclaimer, the term of this patent is extended or adjusted under 35 U.S.C. 154(b) by 149 days.

(21) Appl. No.: 11/252,634

(22) Filed: Oct. 19, 2005

(65) Prior Publication Data
US 2006/0122798 A1    Jun. 8, 2006

Related U.S. Application Data

(60) Provisional application No. 60/619,713, filed on Oct. 19, 2004.

(51) Int. Cl.
*G01M 15/00*    (2006.01)
(52) U.S. Cl. .................................... 73/112.01
(58) Field of Classification Search .............. 73/112.01, 73/112.03, 112.04, 112.05, 112.06
See application file for complete search history.

(56) References Cited

U.S. PATENT DOCUMENTS

| | | | | |
|---|---|---|---|---|
| 4,468,620 A | * | 8/1984 | Vaerman ..................... | 324/261 |
| 5,479,826 A | * | 1/1996 | Twerdochlib et al. ......... | 73/660 |
| 5,942,893 A | | 8/1999 | Terpay | |
| 7,023,205 B1 | * | 4/2006 | Krupp ......................... | 324/239 |
| 2004/0051525 A1 | * | 3/2004 | Hatcher et al. .............. | 324/262 |
| 2005/0200355 A1 | * | 9/2005 | Hatcher et al. .............. | 324/239 |
| 2005/0270519 A1 | * | 12/2005 | Twerdochlib ................. | 356/24 |
| 2006/0078193 A1 | * | 4/2006 | Brummel et al. ............ | 382/152 |
| 2006/0097719 A1 | * | 5/2006 | Moore ......................... | 324/237 |
| 2006/0120197 A1 | * | 6/2006 | Teolis et al. ................. | 365/226 |

OTHER PUBLICATIONS

Dowell, M., et al., "Turbomachinery Prognostics and Health Management via Eddy Current Sensing: Current Developments", Preprint, 1998.
Teolis, C., et al., "Analytic Representation of Eddy Current Sensor Data for Fault Diagnostics", pp. 1-11, undated.
Haase, W. C., et al., "Detection and Characterization of Blade/Disk Cracks in Operational Turbine Engines", Proceedings of IEEE Aerospace Conference, 2003.
Jones., H., "A Nonintrusive Rotor Blade Vibration Monitoring System", ASME 96-GT-84, International Gas Turbine and Aeroengine Conference, 1996.

(Continued)

*Primary Examiner*—Eric S McCall
(74) *Attorney, Agent, or Firm*—DLA Piper US LLP

(57) ABSTRACT

Methods and apparatuses are described for determining the operating status of a turbine engine. An eddy current sensor is provided having a sensing field in communication with a plurality of rotating turbine blades during a revolution of a turbine engine. The sensor generates signature data for the passage of each blade. An analytic waveform is determined from the signature data and blade characteristic data is determined from the analytic waveform.

32 Claims, 10 Drawing Sheets

OTHER PUBLICATIONS

Lackner, M., "Vibration and Crack Detection in Gas Turbine Engine Compressor Blades using Eddy Current Sensors", MIT Thesis, Master of Science, 2004.

Heath, S., "A New Technique for Identifying Synchronous Resonances Using Tip-Timing", ASME-2000, Journal of Engineering for Gas Turbines and Power, vol. 122, Apr. 2000.

Health, S., et al., Heath and M. Imregun, "An Improved Single-Parameter Tip-Timing Method For Turbomachinery Blade Vibration Measurements Using Optical Laser Probes", Int. J. Mech. Sci., vol. 38, No. 10, pp. 1047-1058, 1996.

Heath, S., et al., "Turbomachinery Blade Tip Measurement Techniques", Rolls-Royce Civil Aero Engines Ltd, undated.

* cited by examiner

Blade and sensor geometry.

The ECS model signature for typical parameters.

Analytic ECS waveform (real, imaginary, and magnitude).

Analytic ECS waveform (polar representation).

Instantaneous frequency associated with the Analytic ECS waveform.

METHOD OF DETERMINING THE OPERATING STATUS OF A TURBINE ENGINE UTILIZING AN ANALYTIC REPRESENTATION OF SENSOR DATA

CROSS-REFERENCE TO RELATED APPLICATION

This application is related to and claims priority from Provisional Patent Application Ser. No. 60/619,713 filed Oct. 19, 2004, the entire disclosure of which is incorporated by reference herein.

FIELD

This disclosure relates generally to the field of turbine engine monitoring, and more specifically to utilizing an analytic representation of sensor data for determining the operating status of a turbine engine.

BACKGROUND

An eddy current sensor may be utilized for determining the operating status of a turbine engine in both research and field implementations. Various signal processing techniques have been developed to utilize sensor data to detect and predict blade fault conditions such as blade stall, vibration and crack formation. However, many of these signal processing techniques have been limited to parametric measurements (e.g., zero crossing locations or maxima) associated with the eddy current sensor voltage waveform. It would be advantageous if a new representation of eddy current sensor data could be developed that provides for alternative interpretations of existing methods of fault detection and for new approaches to fault detection. Specifically, it would be advantageous if the entire eddy current sensor waveform could be analyzed to determine the operating status of a turbine engine rather than just parametric measurements taken from the waveform.

SUMMARY

The invention relates to methods and apparatuses for determining the operating status of a turbine engine. A sensor is provided having a sensing field in communication with a plurality of rotating turbine blades during a revolution of a turbine engine. The sensor generates signature data for the passage of each blade. An analytic waveform is determined from the signature data and blade characteristic data is determined from the analytic waveform. An eddy current sensor is utilized in preferred embodiments.

BRIEF DESCRIPTION OF THE DRAWINGS

The features and advantages of the present invention will become more apparent from the detailed description set forth below when taken in conjunction with the drawings in which like reference numbers indicate identical or functionally similar elements.

DETAILED DESCRIPTION OF SEVERAL EMBODIMENTS

Various preferred embodiments of methods and apparatuses for determining the operating status of a turbine engine are discussed below. Specific details are set forth in order to provide a thorough understanding of the present invention. The specific embodiments described below should not be understood to limit the invention. Additionally, for ease of understanding, certain method steps are delineated as separate steps. These steps should not be understood as necessarily distinct or order-dependent in their performance unless so indicated.

The techniques and methods discussed herein are believed to be particularly applicable to eddy current sensors and hence will be discussed primarily in that context herein. However, it should be understood that the techniques and methods discussed herein may also be practiced with other sensors, including but not limited to pressure sensors, microwave sensors, radar sensors, optical sensors and capacitive sensors.

Figure 8A:
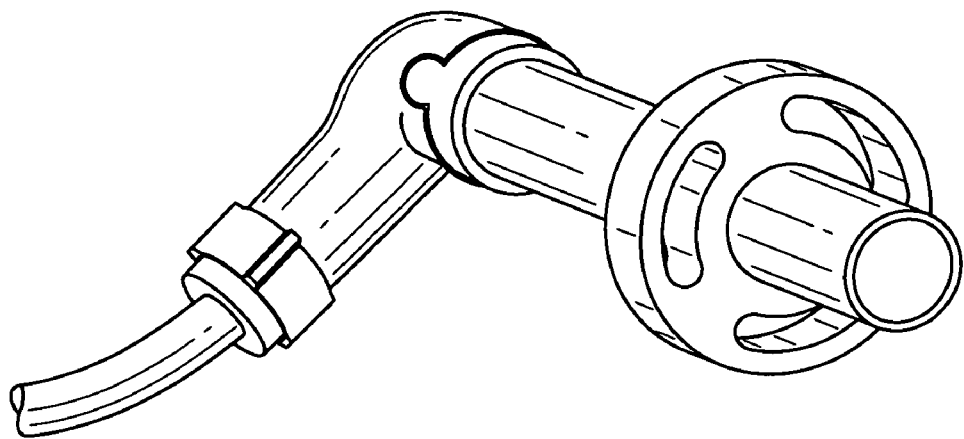
FIGS. 8a and 8b are perspective and schematic views of a two pole eddy current sensor used in some embodiments of the invention.
Figure 8B:
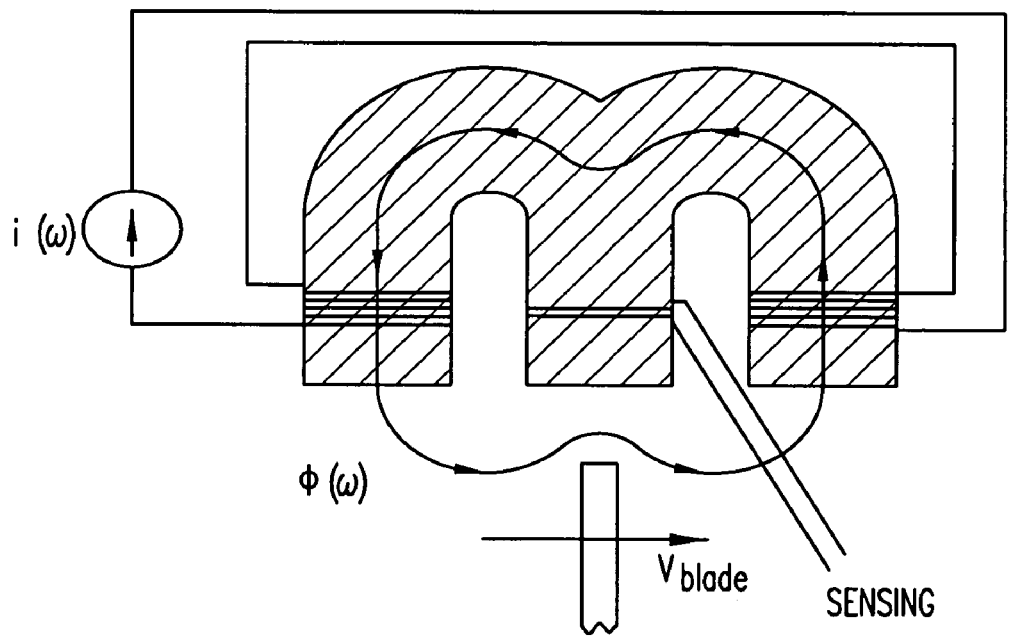

A preferred eddy current sensor with which the techniques and methods discussed herein my be practiced in the two pole (also sometimes referred to as a three leg) eddy current sensor available from General Dynamics (GDAIS) depicted in FIGS. 8a and 8b. However, it should be understood that these techniques and methods may also be practiced with other types of eddy current sensors such as single pole eddy current sensors.

In the figures, in which like reference numerals indicate like elements, there is shown a method of determining the operating status of a turbine engine utilizing an analytic representation of sensor data. An analytic waveform is determined by the projection of magnetic field signature data from a sensor onto the Hardy space which may be determined, for example, by computing the Fourier transform of the signature data, zeroing out the negative frequencies and then computing the inverse Fourier transform to yield the analytic result. In the various embodiments, the analytic waveform is amenable to whole waveform analysis (i.e., consideration of the entire sensor data waveform) to determine the operating status of a turbine engine. As such, the analytic representation of sensor data is useful for providing alternative interpretations and implementations of existing methods of determining the operating status of a turbine engine as well as for providing a new approach to determining the engine operating status and/or fault conditions. For example, the analytic representation of sensor data may be utilized to measure blade characteristic data such as vibration, pitch angle, flutter, tip clearance and mode shape (twist). In various embodiments, such a measurement may be utilized to determine an engine event such as a stall or surge condition at an early stage in the event or prior to the event. Therefore, the embodiments herein are useful to engineers and operators for determining the nature of and diagnosing engine fault conditions.

Figure 1:
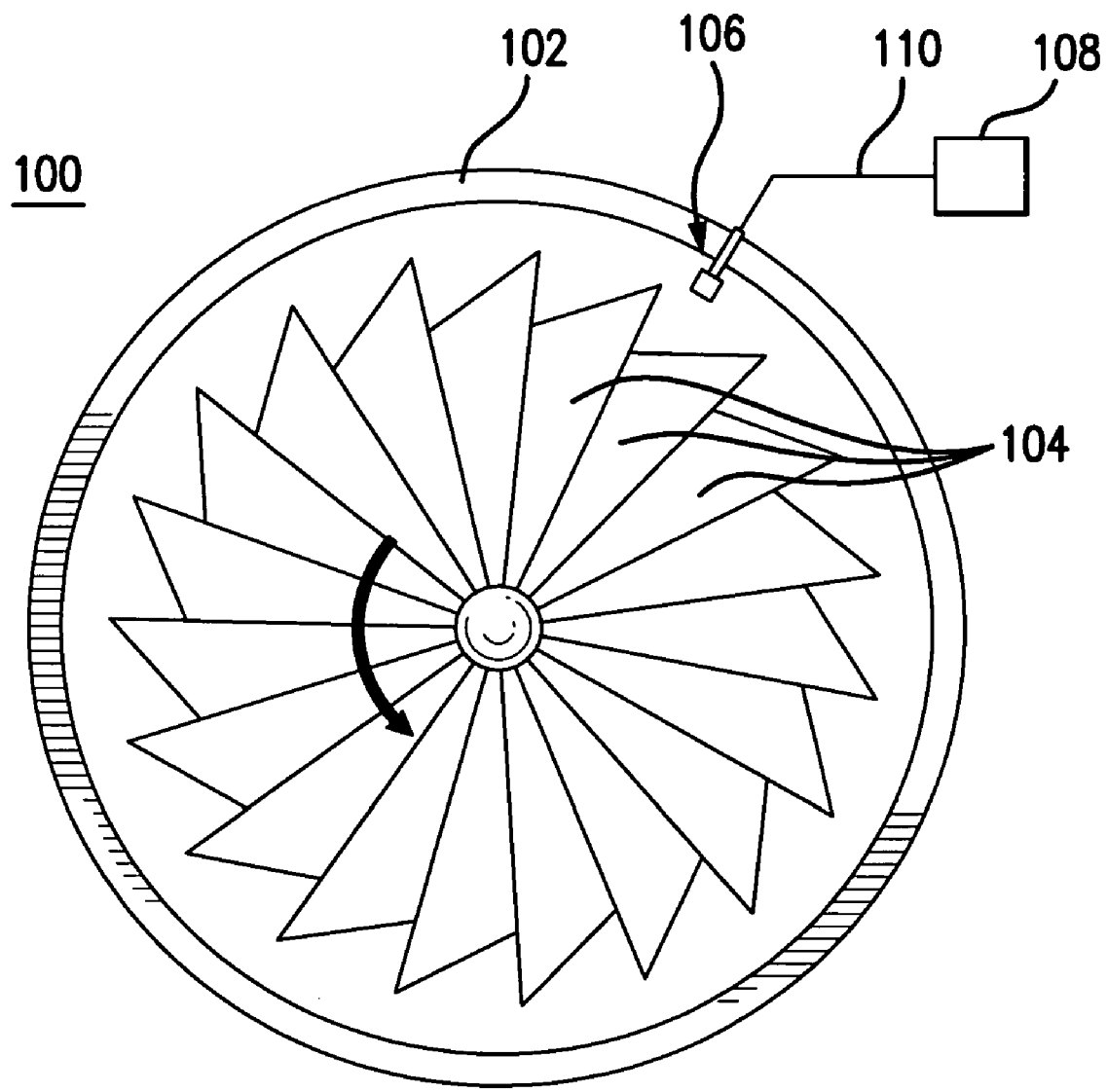
FIG. 1 illustrates a turbine engine fan according to embodiments of the invention.

FIG. 1 illustrates a turbine fan engine 100 comprising a housing 102, a plurality of turbine blades 104 and an eddy current sensor (ECS) 106 which may be in communication with the housing 102. The ECS 106 includes an electromagnetic sensing field in communication with the plurality of turbine blades 104. As discussed above, other types of sensors, such as a pressure sensor, a microwave sensor, and optical sensor, a radar sensor or a capacitive sensor, may be utilized in place of the ECS 106. However, an ECS is particularly well suited for the embodiments herein due to its utility for monitoring conductive moving parts, immunity to gas stream properties, adaptability to the extreme temperature environment of a turbine engine compressor stage, relatively low power consumption, low cost and ease of installation in field operational engines.

In the various embodiments described below, the ECS 106 measures the induced flux due to the relative motion between itself and each blade 104 to generate blade signature data for the passage of each blade 104 during a revolution of the turbine engine 100. The blade signature data may be utilized to determine blade characteristic data. Blade characteristic data may include, for example, vibration, pitch angle, flutter, tip clearance, and twist. The blade characteristic data may be further utilized to determine an engine operating condition such as, for example, a stall, pre-stall or surge condition.

A processor 108, which may be a component within the ECS 106 or be located remotely from the ECS 106, may receive data either internally or via a real-time communication link 110 from the ECS 106 based on the selected configuration. The processor 108 may be programmed to perform various operations to determine the operating status of the engine 100, as will be described in more detail below. While various embodiments herein are described as being performed by the processor 108, it should be understood that such descriptions may be simplified for ease of understanding. One skilled in the art will note that the various steps may be implemented by a single processing device or by a plurality of processing devices working independently or in conjunction with each other. Further, the processing aspects of the various embodiments may be implemented by any combination of hardware, software and/or firmware.

As used herein, a turbine engine 100 is defined as an engine comprising a plurality of blades generally arranged in a circular fan configuration and having one or more compression stages. A turbine engine 100 may include, for example, a gas turbine engine for powering an airplane, helicopter or spacecraft; a land-based vehicle such as a turbine powered automobile or train; a water-based vehicle such as a hovercraft or a turbine-powered ship; or a gas turbine engine for power generation. The operating status of the turbine engine 100 may be determined by measurements of blade characteristic data such as vibration, tip clearance, or damaged or missing blades, wherein one or more of these measurements may be indicative of engine acceleration, deceleration, "stall cells" such as rotating stall, flutter (frequency fluctuation) and/or surge conditions.

In the various embodiments below, various methods are described for utilizing an analytic waveform determined from the ECS signature data for the identification of various useful blade characteristic data and the determination of the operating status of a turbine engine. It should be noted that the methods described herein may be adapted for the detection of numerous other engine fault conditions. For example, the various methods described herein may be adapted for the detection of any of a variety of blade characteristics including, but not limited to tip clearance, vibration and pitch angle and can be utilized to detect blade conditions such as dynamic deformations (e.g., blade bending modes due to vibration), static deformations (e.g., missing blade tips), and instability conditions associated with stall and flutter. Therefore, this description should not be understood as limited to detecting only the particular blade parameters or fault conditions used as examples herein.

Figure 2:
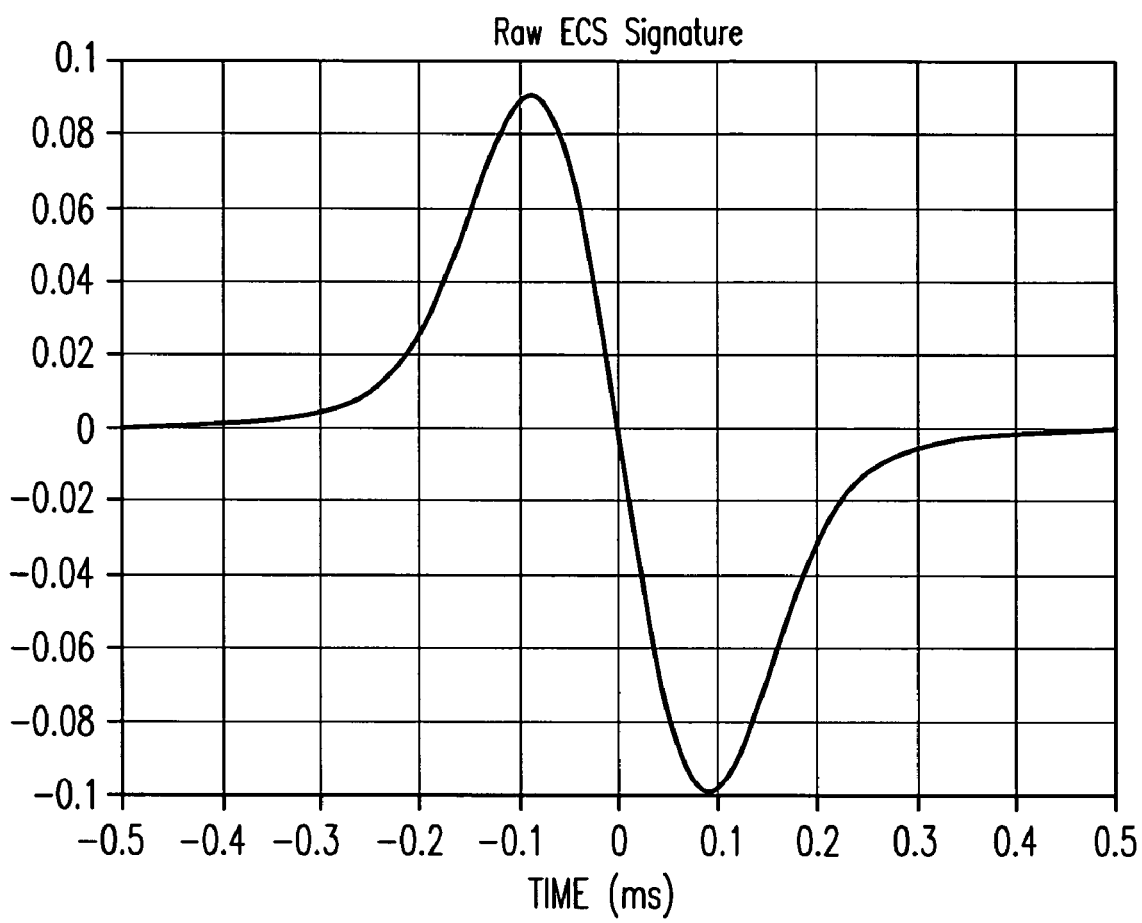
FIG. 2 illustrates an ECS response waveform measured as a function of time according to embodiments of the invention.

For further understanding of the various embodiments, we consider now a mathematical model of the sensing configuration of FIG. 1. In one embodiment, a blade 104 moving past the ECS 106 evokes a response, g, in the ECS 106 that may be measured, for example, as a function of time. Alternatively, the response, g, may be measured as a function of other variables including, but not limited to, rotor speed, tip clearance and blade angle. The response measurement may be received by the processor 108 which may be connected to or a component of the ECS 106 via interface 110. In one embodiment, the processor 108 may be configured to sample the response, g, at a predetermined uniform sampling rate which may range, for example, from between 100 to 800 KHz. FIG. 2 illustrates an ECS response waveform measured as a function of time for a two pole GDAIS ECS.

Figure 3:
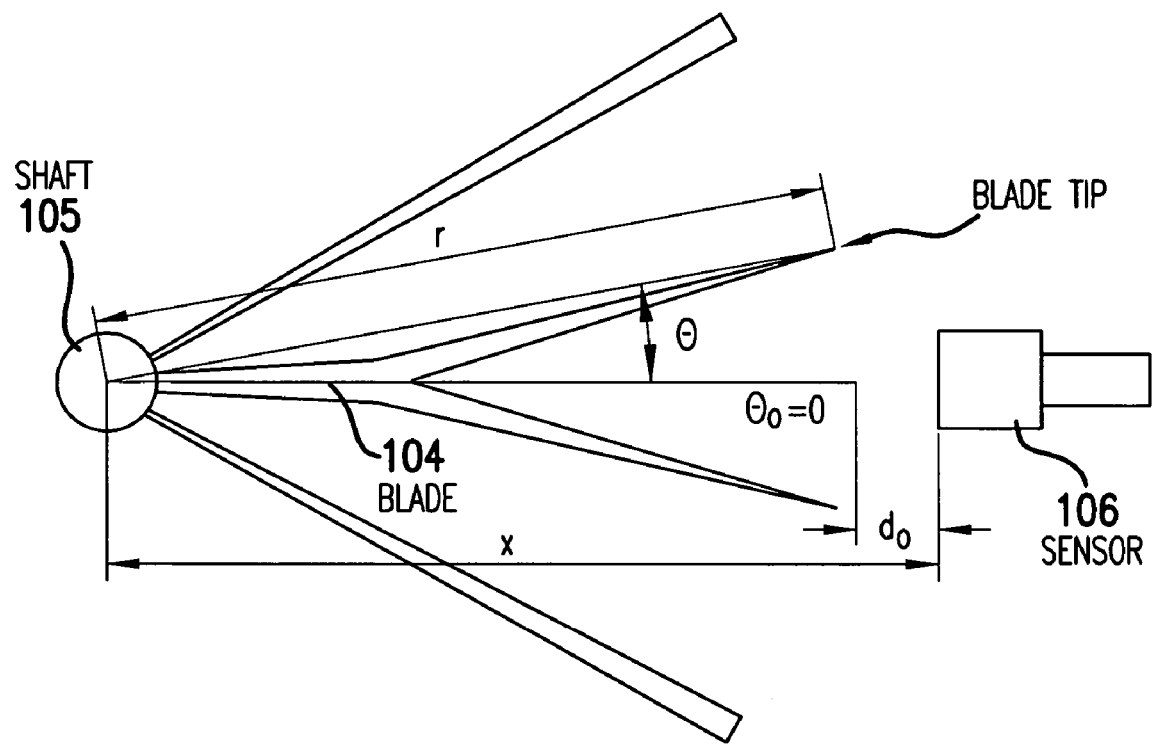
FIG. 3 illustrates the blade and sensor geometry for a single fan blade according to embodiments of the invention.

Based on geometrical considerations and the idea that the ECS response is directly related to the distance between the blade tip and the sensor head (i.e., the sensor clearance), a mathematical model of the response function $g(\theta)$ may be further defined. FIG. 3 illustrates the blade and sensor geometry for a single fan blade 104. The shaft angle of the fan blade 104 is denoted as $\theta_0$ and the tip angle is $\theta$. For clarity, it may be assumed that the distance from the ECS 106 to the shaft 105 of the blade 104 is a fixed value, x. Further, it may also be assumed that the distance, r, from the shaft 105 to the blade tip is fixed (despite changes due to deformations or centrifugal forces), wherein the fixed value x>r. The distance from the blade tip to the ECS 106 as a function of the tip angle $\theta$ is represented as $d(\theta)$.

As mentioned above, the ECS 106 measures the induced magnetic field flux due to the relative motion of the turbine blade 104. The induced flux decays exponentially with blade tip to sensor distance and is a continuous function that changes sign as the blade tip passes through $\theta=0$. As such, using the law of cosines, $d(\theta)$ may be written as a function of the physical parameters as $$d^2(\theta)=r^2+x^2-2rx\cos(\theta).$$

The smallest sensor to tip distance is attained when the tip angle is zero and is denoted $d_0=d(0)=r-x$. This value is also called the clearance.

Figure 4:
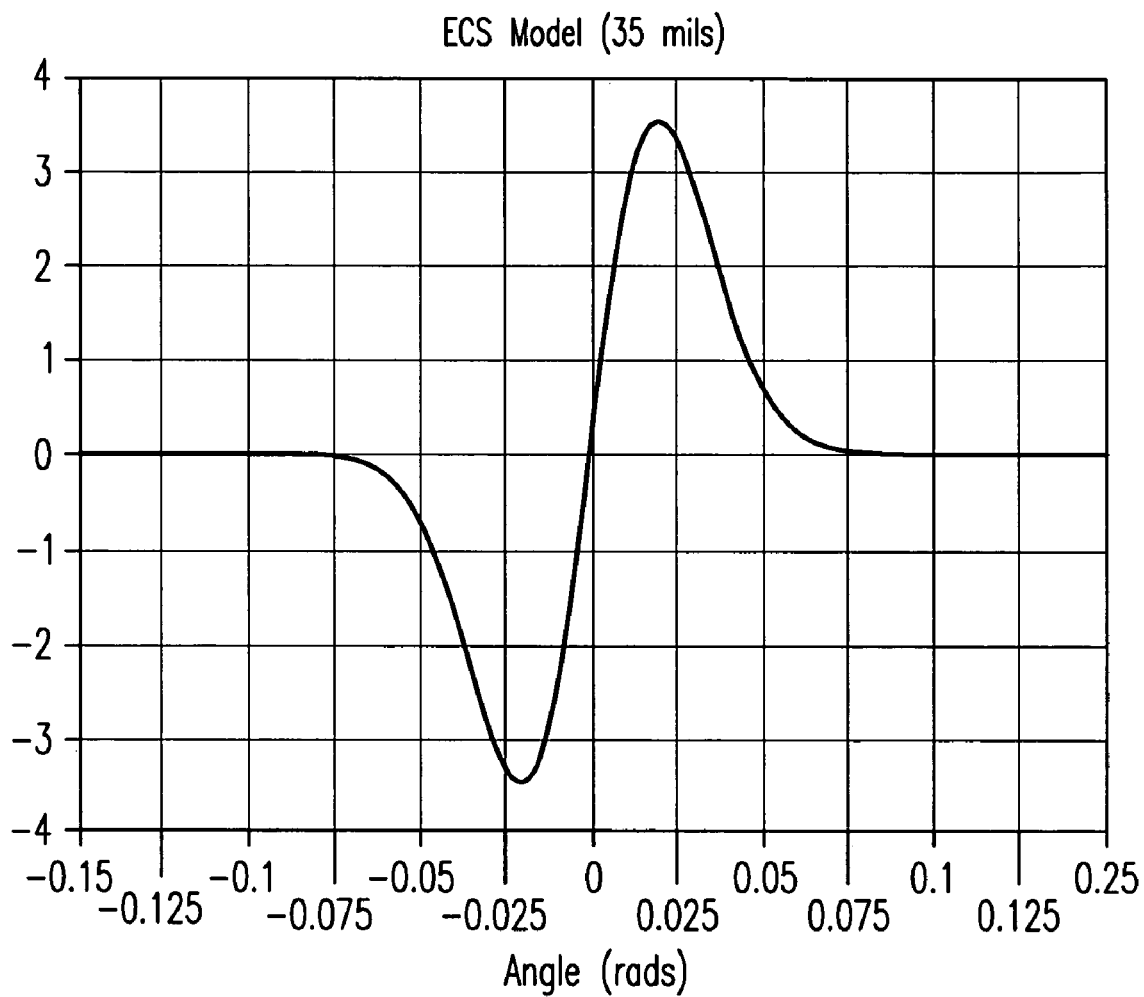
FIG. 4 illustrates a waveform for the ECS signature model according to embodiments of the invention.

The combination of the above parameters leads to a sensor signature model, $g(\theta)$, that can be written as a function of blade tip angle $\theta$:

$$g(\theta)=M_{d0}*\theta*e^{-\beta d2(\theta)},$$

wherein $M_{d0}$ and $\beta$ are empirical constants in which $M_{d0}$ is a scaling factor that is fixed for a fixed sensor geometry and $\beta$ determines the rate of decay of the signature as the tip angle moves away from zero. The constant $\beta$ is directly related to the aperture of the ECS 106 (i.e., the range of $\theta$ for which the sensor provides significant output in response to the blade stimulus). FIG. 4 illustrates a waveform for the ECS signature model.

The analytic representation of the ECS signature model may be interpreted as the projection of the signature model onto the Hardy space $H^2$ which consists of those functions whose Fourier transform vanishes off of the positive frequency axis. Given the real blade signature g(t) as a function of time, the ECS signature model's complex extension can be written as the function $$z(t)=g(t)+jHg(t),$$

where H denotes the Hilbert transform formally given by $$(Hg)(t)=1/\pi \int g(s)/(t-s)ds,$$

wherein the signal z(t) is the analytic extension of the real signal g(t). As such, in one embodiment the analytic signal may be determined by the processor 108 by computing the signal's Fourier transform, zeroing out the negative frequencies and then computing the inverse Fourier transform of the result.

The properties of the analytic signal may then be used to compute various properties including magnitude, instantaneous phase and instantaneous frequency. For example, for the analytic function given by $$z(t)=M(t)*e^{j2pi\int f(s)ds},$$

the functions for magnitude, instantaneous phase and instantaneous frequency are given by, respectively, $$M(t)=|z(t)|=\sqrt{(g(t))^2+((Hg)(t))^2};$$

$$\Phi(t)=\tan-1((Hg)(t)/g(t));\ \text{and}$$

$$f(t)=\tfrac{1}{2}\pi d/dt\ \Phi(t).$$

Figure 5:
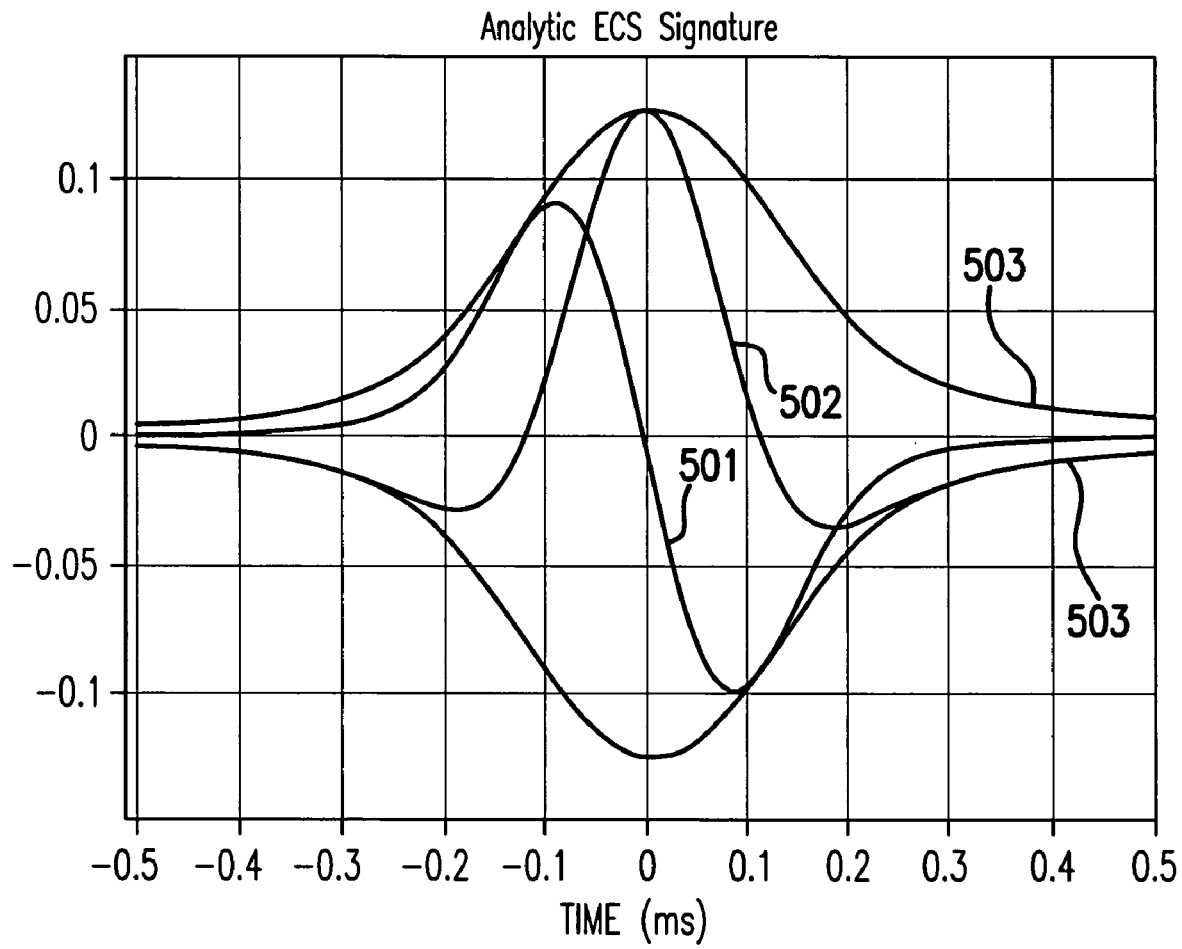
FIG. 5 shows the computed analytic ECS signal for the signature signal of FIG. 2.

FIG. 5 shows the computed analytic ECS waveform for the signature signal of FIG. 2. The complex function z is shown as three real functions of time overlapping each other: the real part, Re {z} 501, the imaginary part, Im {z} 502, and the magnitude {z} 503, wherein the real part is the ECS signature signal.

Figure 6:
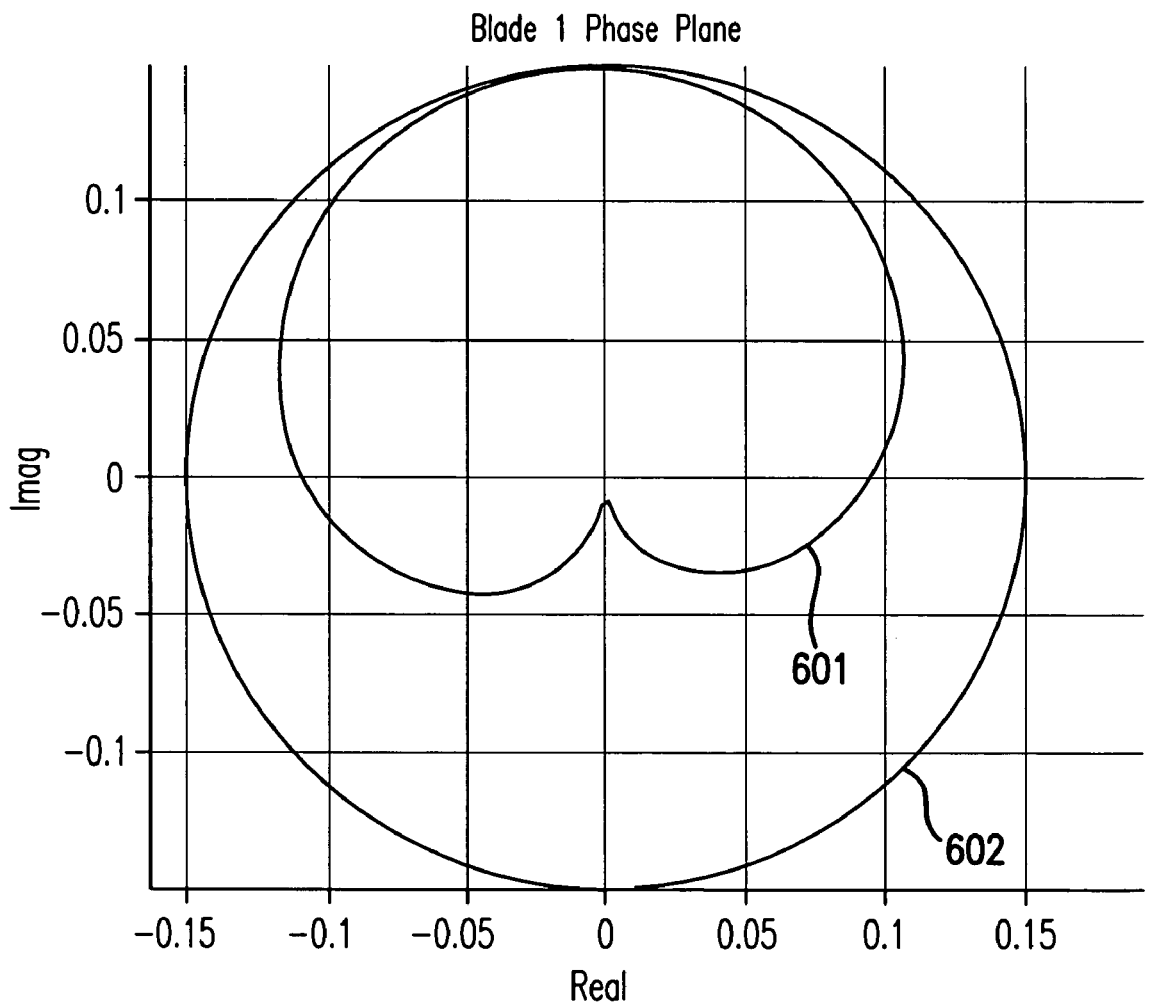
FIG. 6 illustrates an alternate view of the analytic waveform according to embodiments of the invention.

An alternate view of the analytic waveform is illustrated in FIG. 6. In FIG. 6, the signal 601 is presented in the phase plane (i.e., real v. imaginary), which represents the blade response as a function of phase angle only. It can be observed that the trajectory of the signature in the phase plane follows a cardiodal shape. (The fixed radius circle 602 is plotted for reference.) It is of particular note that the phase plane is independent of time and, as such, is not directly sensitive to rotor speed.

Figure 7:
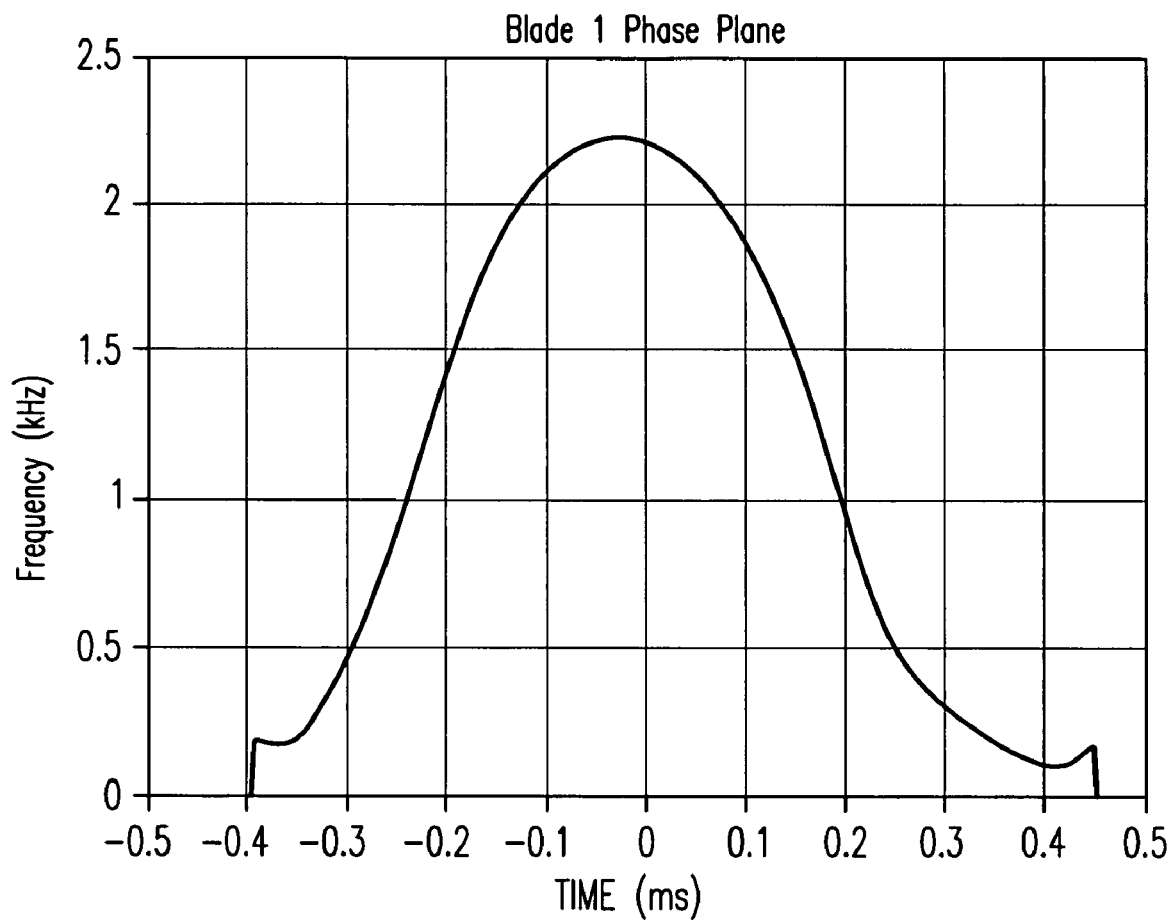
FIG. 7 illustrates the instantaneous frequency corresponding to the measured blade response according to embodiments of the invention.

FIG. 7 illustrates the instantaneous frequency corresponding to the measured blade response. One interpretation of the instantaneous frequency is that its value represents the frequency of the best fitting sinusoidal oscillation of the signal at each instant in time. Thus if the ECS signal were a perfect sinusoid, the instantaneous frequency of the ECS signal would be a constant. It can be observed from FIG. 7 that the nominal ECS signal starts at a very low frequency, ramps up to a high frequency and then ramps back down to zero. The nominal ECS frequency is a function of the sensor design Blade vibration causes the ECS signal to distort, perhaps making one lobe narrower and increasing the frequency and making the other lobe wider and decreasing the frequency. Any distortion in the instantaneous frequency from its nominal value (i.e., its value when there is no vibration) can be an indicator of vibration. Thus the frequency of the mechanical vibration of the blade is related to the difference in the instantaneous frequency from its nominal value.

In various embodiments, the analytic waveform has numerous potential uses in determining the operating status of a turbine engine. For example, the analytic waveform may be utilized for the analysis of whole waveform measures including, for example, instantaneous frequency and magnitude as discussed above. In another example, because the analytic waveform may be independent from rotor speed, the waveform may be utilized for algorithms that are sensitive to rotor speed. For example, the ECS signature contracts and dilates as the rotor speed increases and decreases. This makes direct comparison of ECS signatures at different speeds non-trivial. The analytic ECS signature, being speed independent, can be readily compared at varying speeds.

The analytic waveform may be utilized for determining tip timing parameters such as zero crossing points and local maxima, which are the basis for various algorithms related to turbine engine diagnostics. For example, the analytic signal may be utilized to determine the zero crossings of an ECS signature signal. As can be seen in FIG. 5, it is believed by the inventors that the magnitude waveform 503 is at its maximum at the zero crossing point of the real portion waveform 501. Thus, by detecting the maximum using the magnitude waveform 501, the point at which the blade tip passes the ECS can be determined. It will be readily understood by those of skill in the art that detecting the maximum point of the magnitude waveform 501 can be implemented more simply than detecting the zero crossing point of waveform 501.

The analytic waveform may also be utilized for determining scalar measurements such as tip clearance. The tip clearance is inversely related to the analytic maxima. Thus, the tip clearance can be readily calculated by detecting the maxima of the analytic waveform.

In one example, the analytic waveform may be utilized by the processor 108 to determine blade vibration. Blade vibration is a condition that may impact the useful life of a turbine engine and, when it occurs at a resonance, can lead to catastrophic failure of an engine. In general, blade vibration common to turbine engines can be characterized by either "synchronous" or "asynchronous" resonances. Synchronous resonances are excited at integral multiples of rotor speed and are likely induced by periodic perturbation tied to the physical rotation of the blade assembly. Asynchronous resonances are induced mainly by aerodynamic instabilities such as rotating stall and flutter.

In operation, the processor 108 receives magnetic field signature data of the sensor 106 relating to the passage of a plurality of rotating turbine blade during the revolution of the turbine engine 100. The processor is then operable to determine an analytic waveform from the signature data based on the mathematical properties discussed above. For example, the processor 108 may determine the analytic waveform by performing a forward Fourier transform on signature data captured during a predetermined time interval, a zeroing out operation on the negative frequencies of the forward Fourier transform of the signature data and an inverse Fourier transform on the zeroed out forward Fourier transform of the signature data. Given an analytic waveform, the processor 108 may then determine blade characteristic data.

For example, in order to detect synchronous vibration, the processor 108 compares the instantaneous frequency, (which the processor 108 may determine from the analytic waveform representing the captured time interval), in the sensor aperture with a nominal instantaneous frequency representing a non-synchronously vibrating blade at the same RPM. In practice, a look up table of instantaneous frequencies indexed by engine RPM may be used to determine the nominal instantaneous frequency for a measured engine RPM. The processor 108 may then detect a vibration condition when the differences between the nominal IF and the measured IF are crosses a threshold.

Engine vibration should be evident in the measure IFs of analytic ECS signatures. This theory is supported by the following argument. Let zv(t) be the measured analytic signature of a given vibrating blade and z0(t) be the non-vibrating version, c.f., (5.3). As an analytic signal, z has the magnitude/phase representation:

$$z_v(t) = M_v(t) \cdot e^{j2\pi \Phi_v(t)} = M_0(\theta(t)) \cdot e^{j2\pi \Phi_0(\theta(t))}$$

where $M_v$, $M_0$, $\Phi_0$, and $\Phi_v$ are the magnitude and phase of the vibrating and non vibrating blade signatures, respectively. Thus, the instantaneous frequency of the vibrating blade satisfies:

$$f_v(t) = \frac{1}{2\pi} \cdot \frac{d}{dt} \Phi_0(\theta(t)) = \dot{\theta}(t) \cdot f_0(\theta(t)) \approx \dot{\theta}(t) \cdot f_0(t)$$

This approximation is valid for times when the instantaneous frequency is slowly varying, e.g., around the analytic maxima. Thus the change in instantaneous frequency due to the vibration is:

$$\Delta f(t) = f_v(t) - f_0(t) \approx (1 - \dot{\theta}(t)) \cdot f_0(t).$$

In the case of the simple mode vibration given by the equation $$\theta(t) = t + A \sin(\omega_v t + \psi_v)$$

this translates to $$\Delta f(t) \approx -A_v \cdot \omega_v \cos(\omega_v t + \psi_v) \cdot f_0(t)$$

Figure 9:
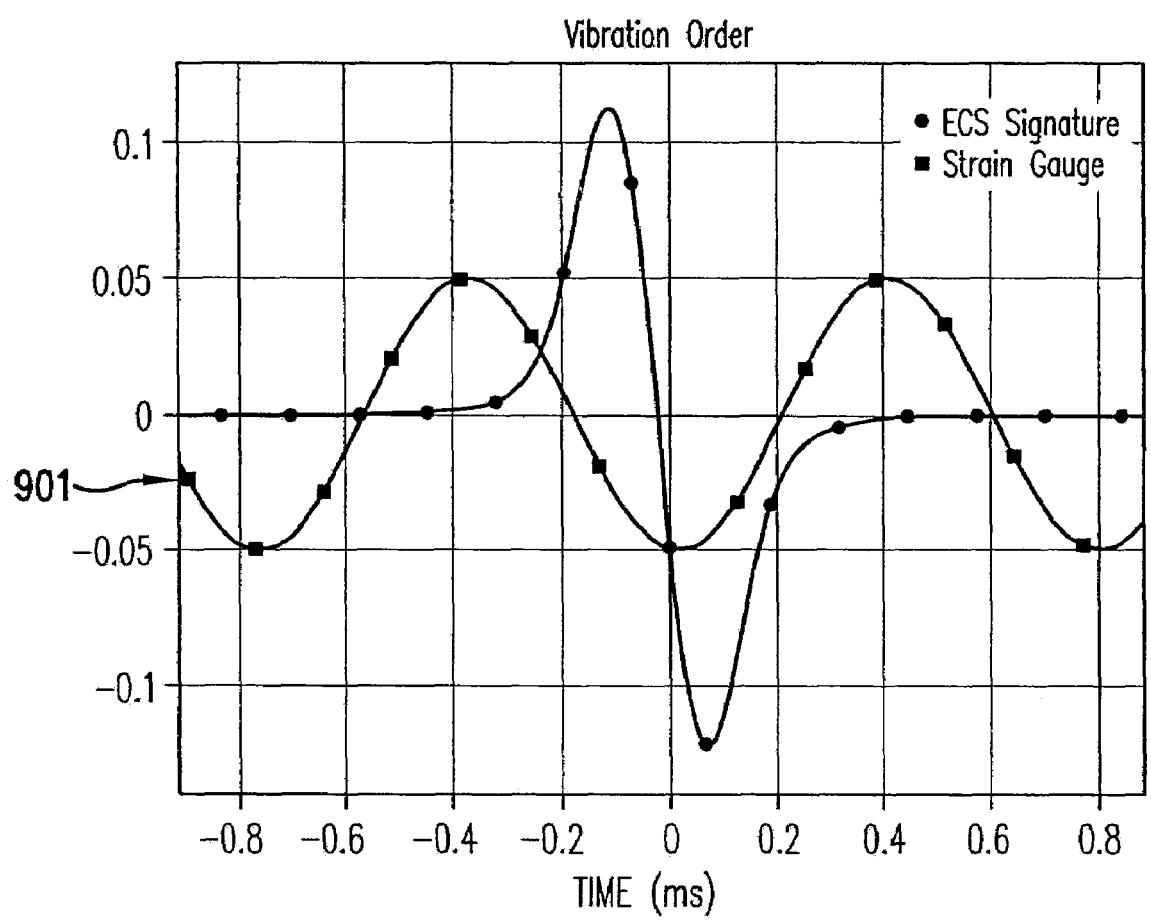
FIG. 9 is a plot of a synchronous vibration imposed on a rotor.
Figure 10A:
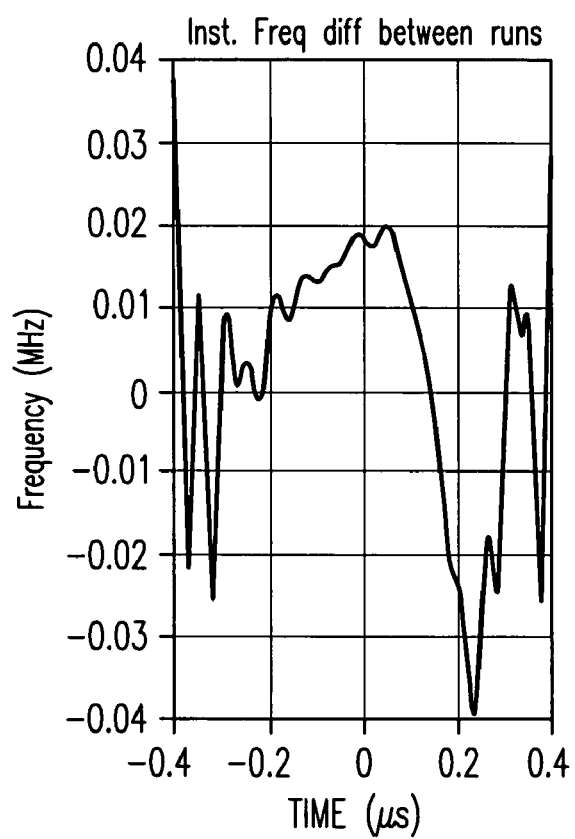
FIGS. 10a and 10b are plots of differences in averaged measured instantaneous frequencies in a rotor with and without the synchronous vibration of FIG. 9 applied.
Figure 10B:
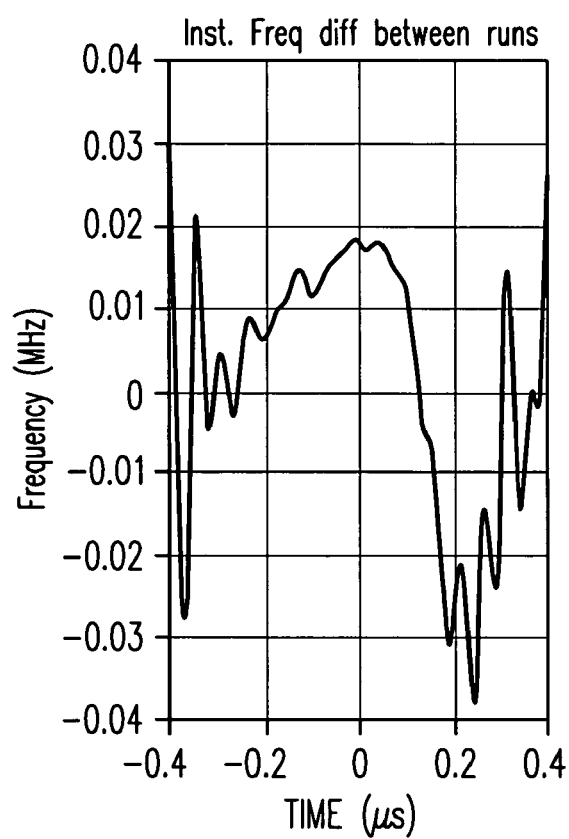

Experimented results confirm the ability to detect engine vibration by measuring the IF of an engine blade. The results discussed herein were obtained using date collected using a three blade rotor mounted in a test spin pit located in the Gas Turbine Lab at the Massachusetts Institute of Technology. Details of spin pit construction and use are given in M. Lacker, "*Vibration and Crack Detection in Gas Turbine Engine Compressor Blades using Eddy Current Sensors*", MIT Thesis, Master of Science, 2004. Using the spin pit, a synchronous vibration 901 as illustrated in FIG. 9 was applied to the three bladed rotor and approximately 5 seconds of data were collected. The IFs in the sensor aperture for each blade passage were calculated and averaged. The sensor aperture, which is the time interval in which the ECS system data is significant, is approximately −0.2 to 0.2 μs. These average IFs were then compared to average IFs measured when no synchronous vibration was applied to the three blade rotor (i.e., nominal IFs). FIGS. 10*a* and 10*b* illustrate plots of the differences between the IFs measured when the synchronous vibration was applied to the rotor and the IFs measured when no vibration was applied (the nominal IFs) for the first and last 2.5 seconds of the data, respectively. As shown in FIGS. 10*a* and 10*b*, there is a detectable change in the differences between the measured and nominal IFs, thereby confirming that the difference between the measured IF and the nominal IF can be used to detect engine vibration.

A variety of modifications to the embodiments described will be apparent to those skilled in the art from the disclosure provided herein. Thus, the invention may be embodied in other specific forms without departing from the spirit or essential attributes thereof and, accordingly, reference should be made to the appended claims, rather than to the foregoing specification, as indicating the scope of the invention.

What is claimed is:

1. A computerized method of determining the operating status of a turbine engine, comprising the steps of:
   providing a sensor having a sensing field in communication with a plurality of rotating turbine blades during a revolution of a turbine engine, wherein said sensor generates signature data for the passage of each blade;
   determining an analytic waveform from said signature data; and
   determining blade characteristic data from said analytic waveform.

2. The method of claim 1, wherein the analytic waveform comprises a magnitude waveform, and the blade characteristic data comprises a blade crossing point determined by detecting a maximum point of the magnitude waveform.

3. The method of claim 1, wherein the sensor is an eddy current sensor.

4. The method of claim 3, wherein determining said analytic waveform comprises the steps of:
   performing a forward Fourier transform on said signature data;
   performing a zeroing out operation on the negative frequencies of said forward Fourier transform of said signature data; and
   performing an inverse Fourier transform on said zeroed out forward Fourier transform of said signature data.

5. The method of claim 3, wherein said signature data is measured as a function of one of time, rotor speed, tip clearance or blade angle.

6. The method of claim 3, wherein said signature data is measured utilizing a predetermined uniform sampling rate.

7. The method of claim 3, further comprising determining one of magnitude, instantaneous phase and instantaneous frequency from said analytic waveform.

8. The method of claim 3, wherein said blade characteristic data comprises one of blade clearance, vibration, flutter and twist.

9. The method of claim 3, wherein the eddy current sensor is a two pole eddy current sensor.

10. The method of claim 3, further comprising determining whether said blade characteristic data is indicative of an engine stall or surge condition.

11. The method of claim 10, wherein determining whether said blade characteristic data is indicative of an engine stall or surge condition comprises monitoring trends in said blade characteristic data.

12. A computer-readable medium having computer-executable instructions for performing steps comprising:
   receiving signature data relating to the passage of a plurality of rotating turbine blades during a revolution of a turbine engine;
   determining an analytic waveform from said signature data; and
   determining blade characteristic data from said analytic waveform.

13. The computer-readable medium of claim 12, wherein determining said analytic waveform comprises the steps of:
   performing a forward Fourier transform on said signature data;
   performing a zeroing out operation on the negative frequencies of said forward Fourier transform of said signature data; and
   performing an inverse Fourier transform on said zeroed out forward Fourier transform of said signature data.

14. The computer-readable medium of claim 12, wherein said received magnetic field signature data is measured as a function of one of time, rotor speed, tip clearance or blade angle.

15. The computer-readable medium of claim 12, wherein said received magnetic field signature data is measured utilizing a predetermined uniform sampling rate.

16. The computer-readable medium of claim 12, further comprising determining one of magnitude, instantaneous phase and instantaneous frequency from said analytic waveform.

17. The computer-readable medium of claim 12, wherein said blade characteristic data comprises one of blade clearance, vibration, flutter and twist.

18. The computer-readable medium of claim 12, wherein the analytic waveform comprises a magnitude waveform, and the blade characteristic data comprises a blade crossing point determined by detecting a maximum point of the magnitude waveform.

19. The computer-readable medium of claim 12, wherein the signature data is received from an eddy current sensor.

20. The computer-readable medium of claim 12, further comprising determining whether said blade characteristic data is indicative of a predetermined engine stall or surge condition.

21. The computer-readable medium of claim 20, wherein determining whether said blade characteristic data is indicative of a predetermined engine stall or surge condition comprises monitoring trends in said blade characteristic data.

22. A turbine engine monitor, comprising:
a sensor with a sensing field in communication with a plurality of rotating turbine blades during a revolution of a turbine engine, wherein said sensor generates signature data for the passage of each blade; and
a processor for determining an analytic waveform from said signature data.

23. The turbine engine monitor of claim 22, wherein the processor is further configured to determine blade characteristic data from said analytic waveform.

24. The turbine engine monitor of claim 23, wherein the sensor is an eddy current sensor.

25. The turbine engine monitor of claim 23, wherein said processor determines said analytic waveform by performing a forward Fourier transform on said signature data; performing a zeroing out operation on the negative frequencies of said forward Fourier transform of said signature data; and performing an inverse Fourier transform on said zeroed out forward Fourier transform of said signature data.

26. The turbine engine monitor of claim 23, wherein said processor measures said signature data as a function of one of time, rotor speed, tip clearance or blade angle.

27. The turbine engine monitor of claim 23, wherein said processor determines one of magnitude, instantaneous phase and instantaneous frequency from said analytic waveform.

28. The turbine engine monitor of claim 23, wherein said blade characteristic data comprises one of blade clearance, vibration, flutter and twist.

29. The turbine engine monitor of claim 23, wherein said processor determines whether said blade characteristic data is indicative of a predetermined engine stall or surge condition.

30. The turbine engine monitor of claim 23, wherein said processor measures said signature data utilizing a predetermined uniform sampling rate.

31. The turbine engine monitor of claim 30, wherein determining whether said blade characteristic data is indicative of a predetermined engine stall or surge condition comprises monitoring trends in said blade characteristic data.

32. The turbine engine monitor of claim 30, wherein the analytic waveform comprises a magnitude waveform, and the blade characteristic data comprises a blade crossing point determined by detecting a maximum point of the magnitude waveform.

\* \* \* \* \*